United States Patent [19]
Milton

[11] Patent Number: 5,588,337
[45] Date of Patent: Dec. 31, 1996

[54] MOTOR VEHICLE STEERING COLUMN

[75] Inventor: Thomas J. Milton, Bay City, Mich.

[73] Assignee: General Motors Corporation, Detroit, Mich.

[21] Appl. No.: 420,162

[22] Filed: Apr. 11, 1995

Related U.S. Application Data

[63] Continuation-in-part of Ser. No. 340,999, Nov. 17, 1994, abandoned.

[51] Int. Cl.[6] .................................................. B62D 1/10
[52] U.S. Cl. ........................ 74/552; 403/320; 403/351; 403/374
[58] Field of Search ................... 74/552, 548; 403/350, 403/351, 370, 367, 320, 374, 373, 294, 292

[56] References Cited

U.S. PATENT DOCUMENTS

| | | | |
|---|---|---|---|
| 50,477 | 10/1865 | Hill | 403/351 |
| 1,438,004 | 12/1922 | Vincent . | |
| 1,499,432 | 7/1924 | Williston et al. | 403/320 |
| 1,600,456 | 9/1926 | Diekmann . | |
| 1,640,763 | 8/1927 | Geyer et al. . | |
| 1,862,859 | 6/1932 | Michel | 403/320 |
| 1,879,936 | 9/1932 | Ivandick | 74/552 |
| 3,434,369 | 3/1969 | Runkle | 403/351 |
| 3,572,197 | 3/1971 | Ortlieb | 403/320 |
| 3,815,928 | 6/1974 | Komori | 403/350 X |
| 4,508,467 | 4/1985 | Choffin | 403/351 X |
| 4,721,008 | 1/1988 | Stoops et al. | 74/552 |
| 4,884,469 | 12/1989 | Wrigley | 74/552 |
| 5,144,861 | 9/1992 | Nishijima et al. | 74/552 |
| 5,152,627 | 10/1992 | Arnold | 403/351 X |
| 5,267,480 | 12/1993 | Krizan | 403/370 X |
| 5,277,323 | 1/1994 | Wallace et al. | 403/374 X |
| 5,417,518 | 5/1995 | Bierwith | 403/374 |

FOREIGN PATENT DOCUMENTS

| | | | |
|---|---|---|---|
| 450881 | 8/1949 | Italy | 403/374 |
| 140364 | 12/1947 | Sweden | 403/351 |
| 191223 | 1/1923 | United Kingdom | 74/552 |

*Primary Examiner*—Charles A. Marmor
*Assistant Examiner*—David Fenstermacher
*Attorney, Agent, or Firm*—Saul Schwartz

[57] ABSTRACT

A motor vehicle steering column including a steering shaft, a steering wheel having a hub thereon, and a lateral thrust attachment between the steering shaft and the hub of the steering wheel. In a first preferred embodiment, the lateral thrust attachment includes a cylindrical passage in the hub having a pair of flat sides converging in a V-shape, a first cylindrical journal on the steering shaft in the cylindrical passage in the hub having a matching pair of the flat sides converging in a V-shape, a laterally eccentric cylindrical cavity in the hub around a second cylindrical journal on an end of the steering shaft, and an eccentric sleeve on the second cylindrical journal in the eccentric cavity. In a second preferred embodiment, lateral thrust between the hub and the steering shaft is induced directly by a rod on the hub which laterally traverses the end of the steering shaft. The rod has a frustoconical body which seats in a correspondingly shaped notch in the steering shaft so that bodily movement of the rod relative to the notch induces the aforesaid lateral thrust between the hub and the steering shaft. The rod interfere with the lateral notch to prevent dislodgement of the hub from the steering shaft.

2 Claims, 3 Drawing Sheets

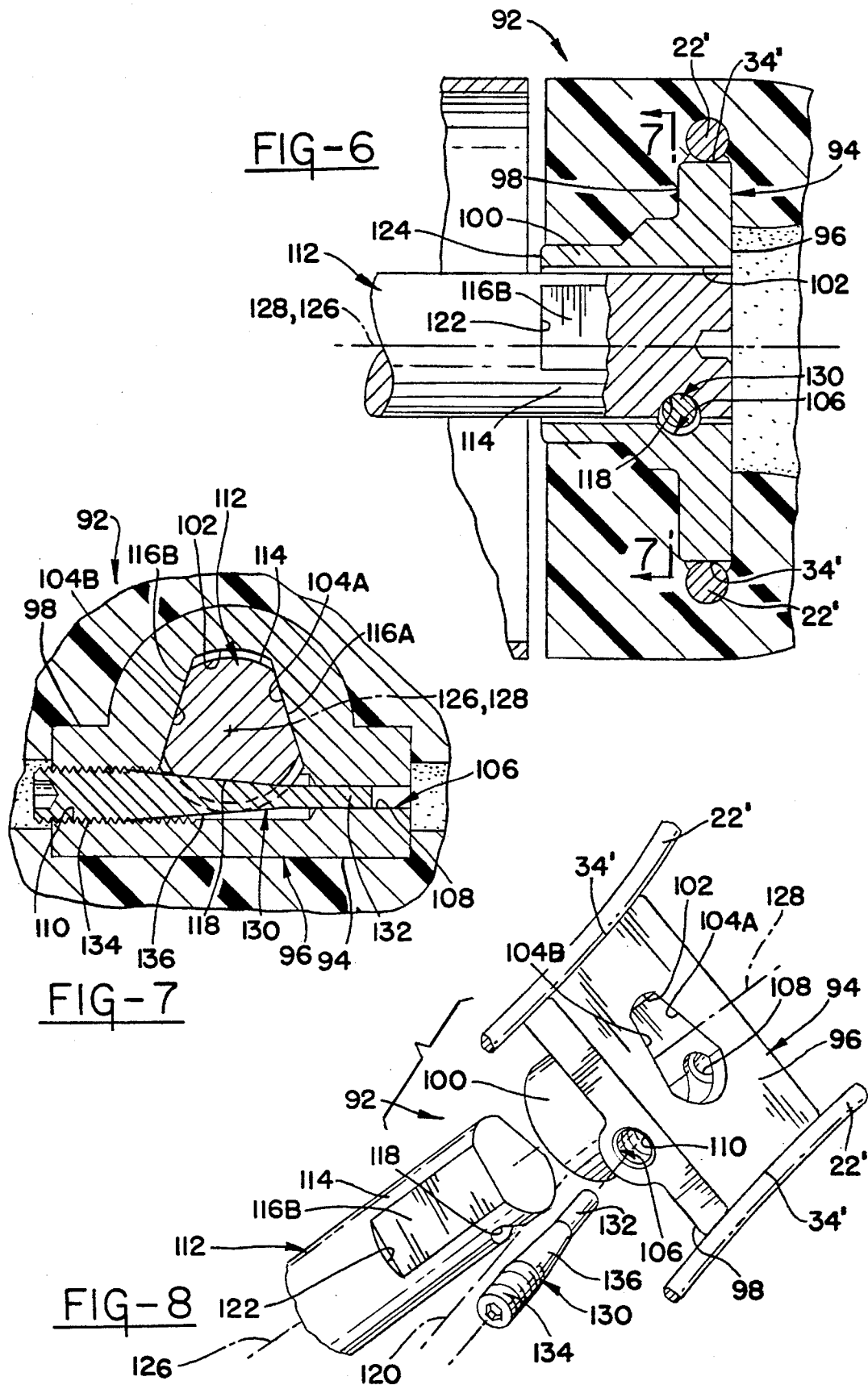

MOTOR VEHICLE STEERING COLUMN

CROSS REFERENCE TO RELATED APPLICATION

This is a continuation-in-part of U.S. patent application Ser. No. 08/340,999, filed Nov. 17, 1994 and assigned to the assignee of this invention, now abandoned.

FIELD OF THE INVENTION

This invention relates to motor vehicle steering columns.

BACKGROUND OF THE INVENTION

Motor vehicle steering columns commonly include a steering shaft having axial splines near an upper end thereof and a steering wheel having a splined bore which fits over the splines on the shaft. The steering wheel is retained by a nut on the shaft in the center of the steering wheel. In a proposed steering column having an alternative to the aforesaid common attachment, the steering is wheel mounted on a bushing which, in turn, is attached to the end of a steering shaft. A lateral set screw on the hub of the steering wheel seats in a notch in the bushing to prevent axial separation between the steering wheel and the bushing. A motor vehicle steering column according to this invention is an improvement relative to prior steering columns having a nut on the steering shaft in the center of the steering wheel and also relative to the prior steering column having set screw retention of the steering wheel on a hub on the steering shaft.

SUMMARY OF THE INVENTION

This invention is a new and improved motor vehicle steering column including a steering shaft, a steering wheel having a hub thereon, and a lateral thrust attachment between the steering shaft and the hub of the steering wheel. In a first preferred embodiment, the lateral thrust attachment includes a cylindrical passage in the hub having a pair of flat sides converging in a V-shape, a first cylindrical journal on the steering shaft in the cylindrical passage in the hub having a matching pair of the flat sides converging in a V-shape, a laterally eccentric cylindrical cavity in the hub around a second cylindrical journal on an end of the steering shaft, and an eccentric sleeve on the second cylindrical journal in the eccentric cavity. Rotation of the eccentric sleeve induces lateral thrust between the hub and the steering shaft which wedges the flat sides of the cylindrical journal between the flat sides of the cylindrical passage for lash-free transfer of torque. In a second preferred embodiment, lateral thrust between the hub and the steering shaft is induced directly by a rod on the hub which laterally traverses the end of the steering shaft. The rod has a frustoconical body which seats in a correspondingly shaped notch in the steering shaft so that bodily movement of the rod relative to the notch induces the aforesaid lateral thrust between the hub and the steering shaft.

BRIEF DESCRIPTION OF THE DRAWINGS

FIG. 6 is similar to FIG. 2 but showing a second preferred embodiment of a motor vehicle steering column according to this invention;

FIG. 7 is a sectional view taken generally along the plane indicated by lines 7—7 in FIG. 6; and FIG. 8 is a fragmentary exploded perspective view of the second preferred embodiment of a motor vehicle steering column according to this invention.

DESCRIPTION OF PREFERRED EMBODIMENTS

Figure 1:
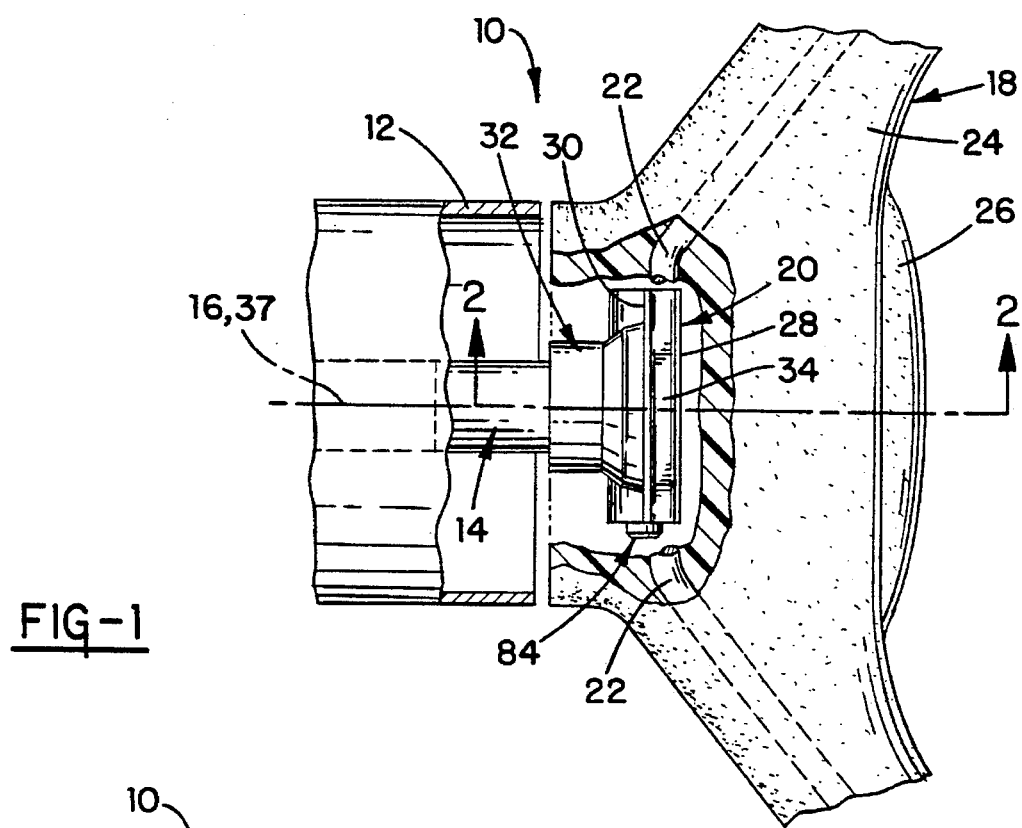
FIG. 1 is a fragmentary partially broken-away view of a first preferred embodiment of a motor vehicle steering column according to this invention.

Referring to FIGS. 1–5, a motor vehicle steering column 10 according to this invention, in a first preferred embodiment, includes a tubular mast jacket 12, a steering shaft 14 supported on the mast jacket for rotation about a longitudinal centerline thereof coincident with a centerline 16 of the steering shaft, and a steering wheel 18. The steering wheel 18 has a center hub 20, a plurality of structural metal spokes 22 welded to the hub, and a molded foam cushion 24 around the hub and the spokes. The foam cushion 24 is recessed over the hub 20 for installation of supplemental inflation restraint apparatus, not shown, behind a cover 26 over the center of the steering wheel.

The hub 20 includes a planar front side 28, a planar back side 30, and an integral tubular boss 32 perpendicular to the back side 30. The structural spokes 22 are welded to the hub 20 at respective ones of a pair of opposite edges 34 thereof, FIGS. 2 and 5. As seen best in FIG. 4, a cylindrical passage 36 in the tubular boss 32 has a longitudinal centerline 37 and a pair of internal flat sides 38A–B converging in a V-shape. An eccentric cavity 39 in the front side 28 of the hub communicates with the passage 36 through a bottom 40 of the cavity, FIGS. 2 and 5. The cavity 39 has a cylindrical side wall 44 and a longitudinal centerline 46 parallel to the centerline 37 and laterally offset from the centerline 37 by an eccentric dimension "D", FIGS. 2, 3 and 5.

The steering shaft 14 has a first cylindrical journal 50 and a smaller diameter, second cylindrical journal 54 adjacent thereto and separated therefrom by an annular shoulder 56. The diameter of the first cylindrical journal 50 is slightly smaller than the diameter of the passage 36 in the tubular boss 32 and is interrupted by a pair of flat sides 58A–B converging in the same V-shape as the flat sides 38A–B of the passage 36. The steering shaft extends into the tubular boss 32 until a shoulder 60 on the steering shaft engages the end of the boss. The centerline 16 of the steering shaft coincides with the centerline 37 of the passage 36 and the second cylindrical journal 54 is disposed in and coextensive with the eccentric cavity 39. Because of the eccentric dimension "D" between the centerlines 37 and 46, an annulus 62 separating the second cylindrical journal 54 on the steering shaft from the side wall 44 of the cavity 39 is correspondingly eccentric.

Figure 5:
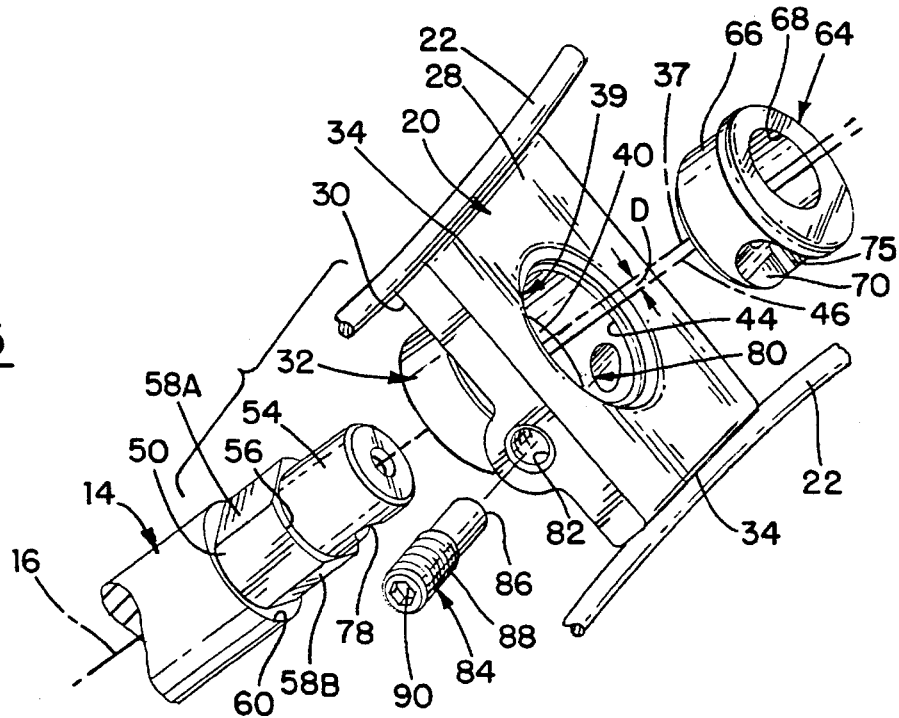
FIG. 5 is a fragmentary exploded perspective view of the motor vehicle steering column according to this invention.

An eccentric sleeve 64, FIG. 5, has a cylindrical outer wall 66 and a cylindrical inner wall 68 eccentric relative to the outer wall by the dimension "D". The diameter of the outer wall 66 generally equals the diameter of the side wall 44 of the cavity 39 in the hub and the diameter of the inner wall 68 generally equals the diameter of the second cylindrical journal 54 on the steering shaft. The sleeve 64 has a seated position in the cavity 39 around the second cylindrical journal 54, FIG. 3, when the eccentricities of the sleeve and the annulus 62 match, i.e. when the centerlines of the inner and outer walls 68, 66 of the sleeve coincide with the centerlines 37, 46 of the passage 36 and the cavity 39, respectively.

Figure 2:
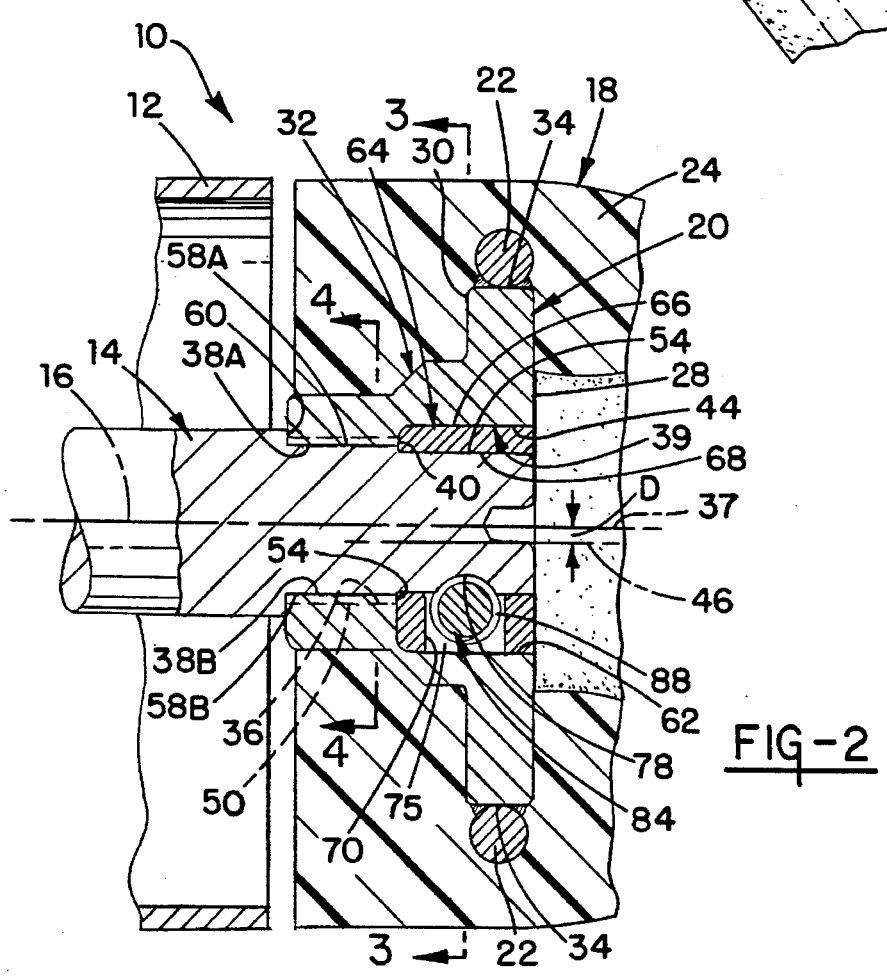
FIG. 2 is a sectional view taken generally along the plane indicated by lines 2—2 in FIG. 1.
Figure 3:
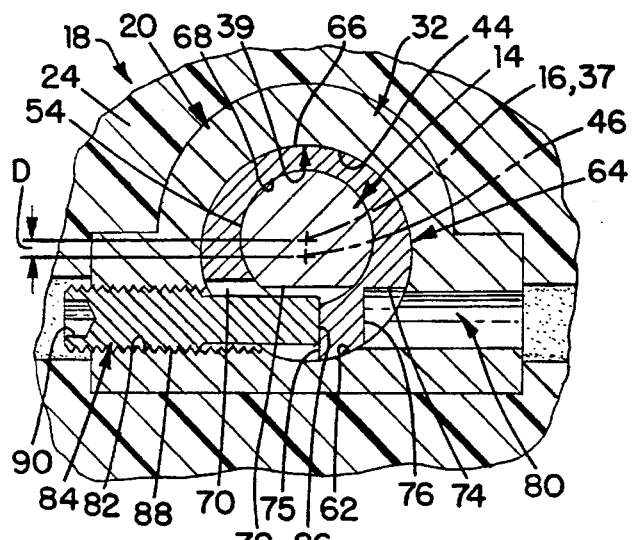
FIG. 3 is a sectional view taken generally along the plane indicated by lines 3—3 in FIG. 2.
Figure 4:
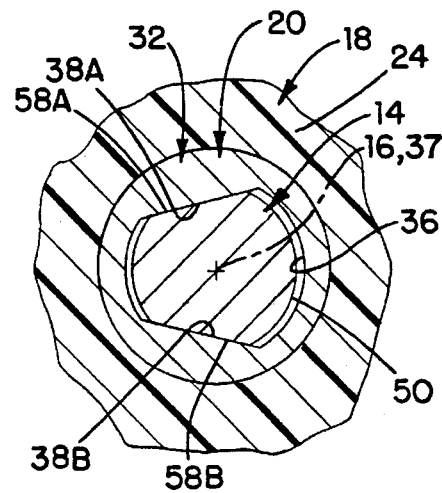
FIG. 4 is a sectional view taken generally along the plane indicated by lines 4—4 in FIG. 2.

As seen best in FIGS. 2, 3 and 5, the sleeve 64 has a perforation 70 and a notch 74 therein. The perforation 70 affords access to a first abutment 75 on the eccentric sleeve. The notch 74 affords access to a second abutment 76 on the eccentric sleeve parallel to the first abutment 75. The second cylindrical journal 54 on the steering shaft has a lateral groove 78 therein which registers with the perforation 70 in the eccentric sleeve 64 in the seated position of the sleeve in the cavity 39.

The hub 20 has a lateral bore 80 therein which intersects the eccentric cavity 39 and which has an internal screw thread 82 in the portion thereof facing the first abutment 75. A control rod 84 is disposed in the lateral bore 82 and extends into the perforation 70 in the eccentric sleeve 64 and into the lateral groove 78 in the steering shaft with an inboard end 86 of the control rod juxtaposed the first abutment 75. An external screw thread 88 on the control rod engages the internal screw thread 82 in the lateral bore 80 so that rotation of the control rod advances and retracts the inboard end 86 of the control rod relative to the first abutment. The cushion 24 of the steering wheel is recessed on opposite sides of the lateral bore 80 to permit access to a socket 90 in the control rod and to the second abutment 76.

With the hub 20 mounted on the steering shaft 14 as described and with the sleeve 64 in its seated position between the second journal 54 and the cavity 39, the sleeve 64 is rotated about the eccentric centerline 46 by inserting a tool in the socket 90 and rotating the control rod 84 to advance the inboard end 86 thereof against the abutment 75. The eccentric sleeve thrusts the hub and the steering shaft in opposite directions perpendicular to the centerline 16 of the steering shaft, i.e. laterally, causing the flat sides 58A–B on the shaft to wedge between the sides 38A–B of the passage 36. A rigid, lash-free driving connection is thus established between the steering shaft and the hub for unitary rotation of the two about the centerline 16 of the steering shaft. To release the hub from the steering shaft, the control rod is rotated in the opposite direction to withdraw the inboard end 86 from the first abutment 75 and a drift is inserted in the lateral bore 80 and forced against the second abutment 76 to unwedge the eccentric sleeve.

Referring to FIGS. 6–8, a second preferred embodiment 92 of a motor vehicle steering column according to this invention includes a hub 94 having a planar front side 96, a planar back side 98, and an integral tubular boss 100 perpendicular to the back side 98. The structural spokes 22' are welded to the hub 94 at respective ones of a pair of opposite edges 34' thereof, FIGS. 6 and 8. A cylindrical passage 102 in the hub 94 extends through the tubular boss 100 and intersects the front side 96 of the hub. The internal wall of the cylindrical passage 102 is interrupted by a pair of flat sides 104A–B converging in a V-shape, FIG. 7. A lateral bore 106 in the hub intersects the passage 102 and is divided by the latter into a first segment 108 on one side of the passage 102 and a second, internal screw threaded segment 110 on the other side of the passage 102. The lateral bore 106 traverses the passage 102 across the wide side or top of the V-shape defined by the flat sides 104A–B, FIG. 7.

A steering shaft 112 of the second preferred embodiment 92 has a cylindrical journal 114 at an upper or distal end thereof the diameter of which is slightly smaller than the diameter of the passage 102 in the hub. The cylindrical journal 114 is interrupted by a pair of flat sides 116A–B converging in the same V-shape as the flat sides 104A–B of the passage 102 and has a transverse or lateral notch 118 therein across the wide side or top of the V-shape defined by the flat sides 116A–B. The lateral notch 118 defines a segment of a frustoconical surface of revolution centered about a lateral axis 120, FIG. 8, of the steering shaft.

The cylindrical journal 114 on the steering shaft is received in the passage 102 to a depth defined by engagement of a shoulder 122 on the steering shaft on an end 124 of the tubular boss 100. A centerline 126 of the steering shaft coincides with a longitudinal centerline 128 of the passage in the hub. A control rod 130 of the second preferred embodiment 92 includes a cylindrical pilot 132 having a diameter matching the diameter of the first segment 108 of the lateral bore 106 in the hub, an external screw threaded barrel 134, and a frustoconical body 136 between the pilot 132 and the barrel 134 matching the lateral frustoconical notch 118.

With the cylindrical journal 114 of the steering shaft in the passage 102 in the hub, the control rod 130 is inserted in the lateral bore 106 to engage the internal and external screw threads on the second segment 110 and the barrel 134. The control rod is then rotated to advance the frustoconical body 136 thereof laterally against the lateral frustoconical notch 118 in the steering shaft. The lateral notch 118 cooperates with the frustoconical body 136 to convert lateral movement of the control rod into lateral thrust between the hub 94 and the steering shaft 112 which wedges the flat sides 116A–B on the shaft between the flat sides 104A–B of the passage 102. A rigid, lash-free driving connection is thus established between the steering shaft and the hub for unitary rotation of the two. The body 136 of the control rod 130 which traverses the lateral notch 118 in the steering shaft blocks dislodgement of the hub from the steering shaft.

Having thus described the invention, what is claimed is:

1. A motor vehicle steering column including a steering shaft, a steering wheel having a hub at the center thereof, a cylindrical passage in said hub interrupted by a first pair of flat sides parallel to a longitudinal centerline of said cylindrical passage converging in a V-shape from a wide side of said cylindrical passage to a narrow side of said cylindrical passage, a cylindrical journal on said steering shaft interrupted by a second pair of flat sides parallel to a longitudinal centerline of said cylindrical journal converging in a V-shape corresponding to the V-shape of said first pair of flat sides of said cylindrical passage from a wide side of said cylindrical journal to a narrow side of said cylindrical journal, said cylindrical journal being received in said cylindrical passage with said first pair of flat sides facing said second pair of flat sides, and means on said steering shaft and on said hub operative to induce lateral thrust between said hub and said steering shaft so that said first pair of flat sides is wedged between said second pair of flat sides and to positively prevent dislodgment of said cylindrical journal from said cylindrical passage, characterized in that said means to induce lateral thrust between said hub and said steering shaft and to positively prevent dislodgment of said cylindrical journal from said cylindrical passage comprises:

a lateral bore in said hub intersecting said cylindrical passage across said wide side thereof and including a first segment on a first side of said cylindrical passage and a second segment on an opposite second side of said cylindrical passage on a common centerline of said lateral bore with said first segment, a control rod in said lateral bore rotatable about said common centerline having a frustoconical body and a first end on one side of said frustoconical body in said first segment of said lateral bore and a second end on the other side of said frustoconical body journaled in said second segment of said lateral bore, an internal screw thread in said first segment of said lateral bore, an external screw thread on said first end of said control rod engaging said internal screw thread and cooperating therewith to effect linear translation of said control rod in said lateral bore in the direction of said common centerline in response to rotation of said control rod, and a lateral notch in said first cylindrical journal across said wide side thereof registering with said lateral bore in said hub having a surface at an angle to said common centerline substantially equal to the cone angle of said frustoconical body of said control rod so that said frustconical body and said surface of said lateral notch cooperate to convert linear translation of said control rod in the direction of said common centerline into lateral thrust of said hub relative to said steering shaft.

2. The motor vehicle steering column recited in claim 1 wherein:

said surface of said lateral notch is a segment of a frustoconical body of revolution substantially matching said frustoconical body of said control rod.

* * * * *